(12) United States Patent  
Lu (10) Patent No.: US 8,706,293 B2  
(45) Date of Patent: Apr. 22, 2014

(54) VENDING MACHINE WITH AUTOMATED DETECTION OF PRODUCT POSITION

(75) Inventor: Pin Lu, Northport, NY (US)

(73) Assignee: Cereson Co., Ltd., Shanghai (CN)

( * ) Notice: Subject to any disclaimer, the term of this patent is extended or adjusted under 35 U.S.C. 154(b) by 153 days.

(21) Appl. No.: 13/306,692

(22) Filed: Nov. 29, 2011

(65) Prior Publication Data

US 2013/0134178 A1     May 30, 2013

(51) Int. Cl.  
*G06F 17/00*     (2006.01)

(52) U.S. Cl.  
USPC ............ 700/242; 221/133; 221/210; 700/215

(58) Field of Classification Search  
USPC .................... 221/210, 133; 700/242, 215, 228  
See application file for complete search history.

(56) References Cited

U.S. PATENT DOCUMENTS

| | | | |
|---|---|---|---|
| 5,788,091 A * | 8/1998 | Robertson et al. | 211/59.2 |
| 6,360,901 B1 * | 3/2002 | Parham | 211/59.2 |
| 6,597,970 B1 * | 7/2003 | Steury et al. | 700/242 |
| 6,682,289 B1 * | 1/2004 | Credle, Jr. | 414/281 |
| 2004/0188455 A1 * | 9/2004 | Shioya | 221/123 |
| 2007/0000939 A1 | 1/2007 | Vasiadis | |
| 2008/0078778 A1 * | 4/2008 | Carter et al. | 221/28 |
| 2011/0022980 A1 | 1/2011 | Segal et al. | |

OTHER PUBLICATIONS

David G. Lowe, "Distinctive Image Features from Scale-Invariant Keypoints", *International Journal of Computer Vision*, Jan. 5, 2004, pp. 1-28.

\* cited by examiner

*Primary Examiner* — Timothy Waggoner  
(74) *Attorney, Agent, or Firm* — Klarquist Sparkman, LLP (57) ABSTRACT

Embodiments of a vending machine are disclosed that can comprise one or more horizontally oriented shelves for supporting products to be vended, a plurality of vertically oriented dividers coupled to the shelves, a plurality of location markers located on the dividers and/or on the shelves, and an optical recognition module configured to optically recognize the location markers and to determine positions of the location markers and products relative to the shelves. In some embodiments, the optical recognition module can recognize the products by comparing images of the products to stored product images.

22 Claims, 11 Drawing Sheets

VENDING MACHINE WITH AUTOMATED DETECTION OF PRODUCT POSITION

FIELD

The present application relates to vending machines, and in particular to detecting product position, such as by optical recognition.

BACKGROUND

In a conventional vending machine, after the machine is loaded with products, the product locations and product identities are typically manually determined and manually entered into a database. A product location that is manually entered is typically a set of X-Y (horizontal-vertical) coordinates or a fixed product slot with a known location. When products are replaced or reorganized, this process is typically repeated and new product identities and product locations are manually entered. If new products are a different size or shape, the person loading the machine sometimes adjusts the heights of the shelves and/or the lateral positions of shelf dividers to accommodate the changes in product size. This typically necessitates manual determination and entry of the new locations of the shelves and dividers, as well as manual entry of the locations and identities of the new products.

In vending machines where a "blind" automated product retrieval device is used to retrieve products based on location coordinates stored in a database, the precision with which a person manually determines and enters the product coordinates can need to be very precise. If the coordinates of a product location are off by just small distance, such a "blind" retrieval device can fail to properly retrieve the product, and can cause problems like knocking the products over on the shelves or damaging the products. This sort of problem often occurs when products shift on the shelves, shelves bow under product weight, the shelves become misaligned, or other similar situations. Furthermore, if an error occurs and a product is retrieved that is not what a purchaser selected, there is no way for conventional vending machines to verify the identity of the retrieved product before it is vended to the purchaser. Vending the wrong product can be a significant issue especially when the products being sold are expensive, such as electronic devices.

SUMMARY

Embodiments of vending machines are disclosed that can determine locations and/or identification information of products in the vending machines.

In one exemplary embodiment, a vending machine comprises at least one horizontally oriented shelf for supporting products to be vended and a plurality of vertically oriented dividers coupled to the shelf, the dividers being individually adjustable side-to-side on the shelf for accommodating different sized products between the dividers. A plurality of location markers are located on the dividers and/or on the shelf. The location markers can be used to determine product position.

The location markers can comprise predetermined patterns and rotational orientations of the patterns can indicate the positioning of corresponding products relative to the location markers. Alternatively, the location markers can include a light source, or other identifiers that can be sensed by a reader to detect presence.

An optical recognition module can be used to automatically detect the location markers. The optical recognition module can comprise an optical sensor that is coupled to a movable carriage. The optical recognition module can be configured to optically scan the shelf, determine the locations of the location markers, and store the locations of the location markers in a database. The vending machine can comprises a plurality of horizontally oriented shelves and the optical sensor can be configured to make multiple horizontal scans across the shelves, each horizontal scan being at a different vertical position, to determine vertical and horizontal positions of the location markers. In response to a selection of a given product, the vending machine can be configured to determine the location of the given product relative to the shelves based on the locations of the location markers stored in the database.

The optical recognition module can also be configured to optically determine identities of the products supported by the shelf. For example, in response to a selection of a desired product, the vending machine can be configured to retrieve the desired product based on the determined positions of the location markers, and the optical recognition module can be configured to verify the identity of the retrieved product by taking an image of the retrieved product and comparing it to an image of the desired product that is stored in a database.

The shelf can be configured to support at least one product resting on an upper surface of the shelf between two of the vertical dividers positioned on opposing sides of the product, and a location marker can be positioned on each of the two vertical dividers. The shelf can comprise hanging features for hanging products from the shelf, and corresponding location markers can be positioned on the hanging features.

An exemplary method can comprise scanning the shelves for location markers using the movable carriage, determining locations of the location markers relative to the shelves, and determining product position on the shelves of the vending machine based on the locations of the location markers. Scanning the shelves for location markers can comprise moving the carriage and an optical sensor coupled to the carriage across the shelves and using the optical sensor to recognize predetermined patterns on the shelves. Determining locations of the location markers can comprise determining horizontal and vertical positions of the location markers relative to a fixed origin. Determining product position on the shelves based on the locations of the location markers can comprise identifying two adjacent location markers having a same rotational orientation, calculating a horizontal distance between the two adjacent location markers, and determining a midpoint between the two adjacent location markers.

This method can further comprise capturing images of products supported by the shelves and comparing the captured images to product images stored in a database to determine identification information for the products supported by the shelves.

This method can further comprise using the determined product position to position the carriage adjacent to a purchaser's selected product, loading the product onto the carriage, and dispensing the product to the purchaser.

Another exemplary method can comprise optically scanning the products using the movable camera, determining identification information of the products based on the optical scanning of the products, and determining location information of the products relative to the support structure based on the optical scanning of the products. Determining identification information of the products can comprise capturing images of the products with the movable camera and comparing the captured images to stored product images. Comparing can comprise using regression analysis, such as dividing the captured images and the stored images into subsections and comparing corresponding subsections of the captured and stored images. Determining location information of the products can comprise determining horizontal and vertical boundaries of the products.

This method can further comprise storing the identification and location information of the products in a database, receiving a selection of a desired one of the products, and retrieving the desired product based on the identification and location information of the products stored in the database. In addition, the method can also include verifying the identity of a retrieved product by capturing an image of the retrieved product and comparing the captured image to an image of the desired product that is stored in a database.

The vending machine, consequently, has the ability to automatically calibrate itself such that exact product positions can be determined. Slight shifting in the sidewalls of the vending machine can easily be dealt with through a new calibration.

The foregoing and other objects, features, and advantages of the invention will become more apparent from the following detailed description, which proceeds with reference to the accompanying figures.

DETAILED DESCRIPTION

In this disclosure, the terms "a", "an" and "at least one" encompass one or more of the specified elements. That is, if two of a particular element are present, one of these elements is also present and thus "an" element is present. The phrase "and/or" means "and", "or" and both "and" and "or". Further, the term "coupled" generally means electrically, electromagnetically, and/or physically (e.g., mechanically or chemically) coupled or linked and does not exclude the presence of intermediate elements between the coupled or associated items absent specific contrary language. Unless specifically stated otherwise, processes and methods described herein can be performed in any order and in any combination, including with other processes and/or method acts not specifically described. The exemplary embodiments disclosed herein are only preferred examples of the invention and should not be taken as limiting the scope of the invention.

Figure 1A:
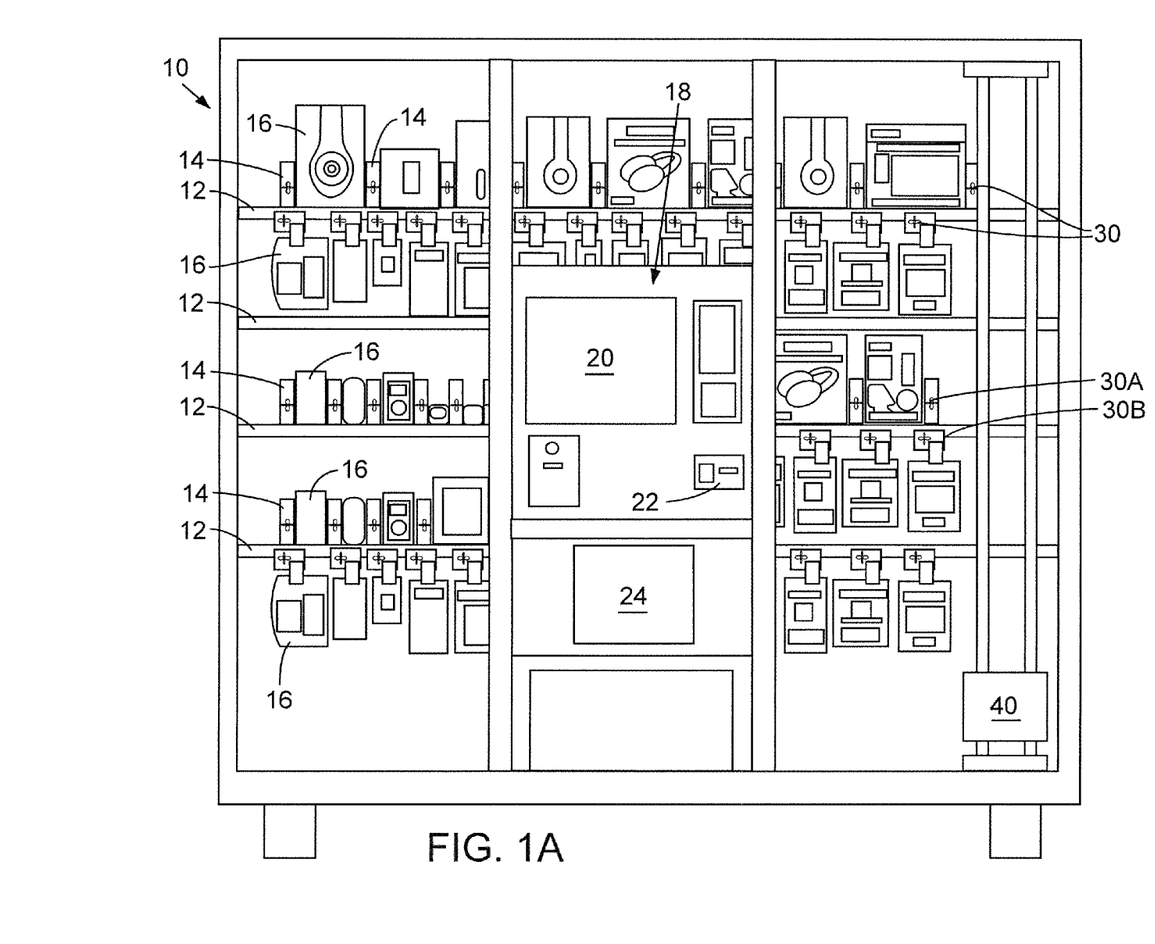
FIG. 1A is a front elevation view of an exemplary vending machine.
Figure 1B:
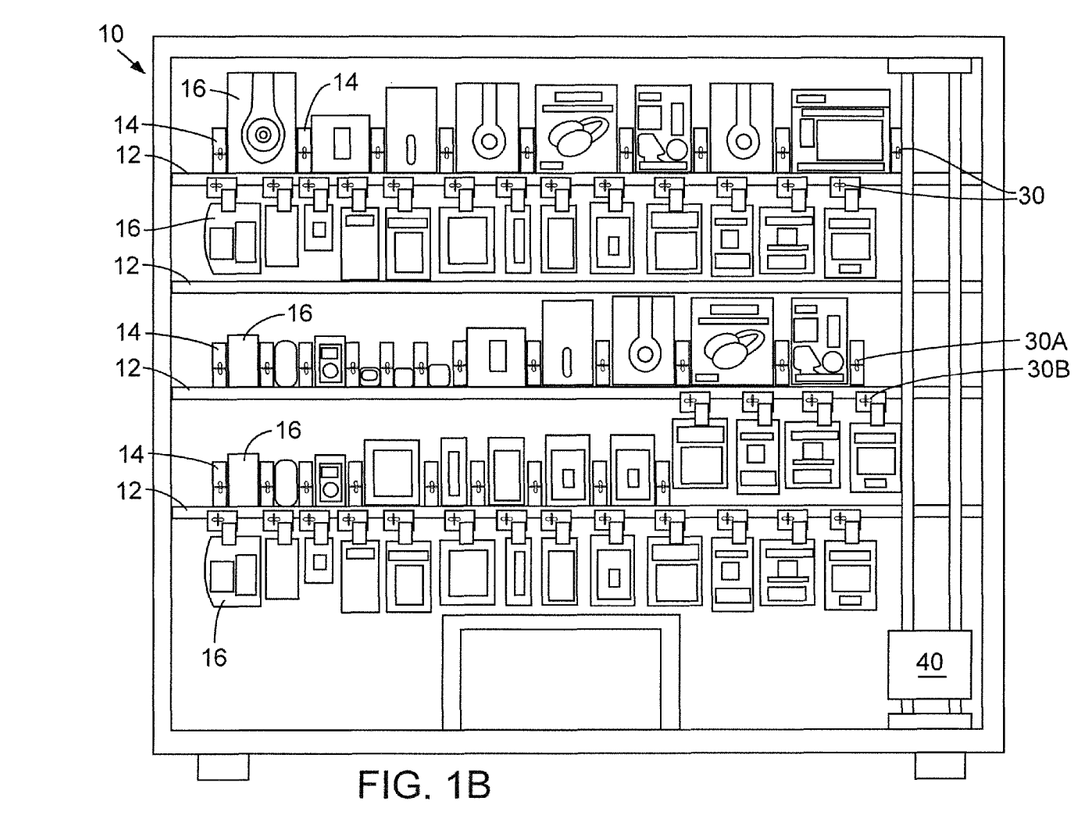
FIG. 1B is a front elevation view of the vending machine of FIG. 1 with a front portion of the vending machine removed to show the shelves and products inside.
Figures 2, 3A, 3B:
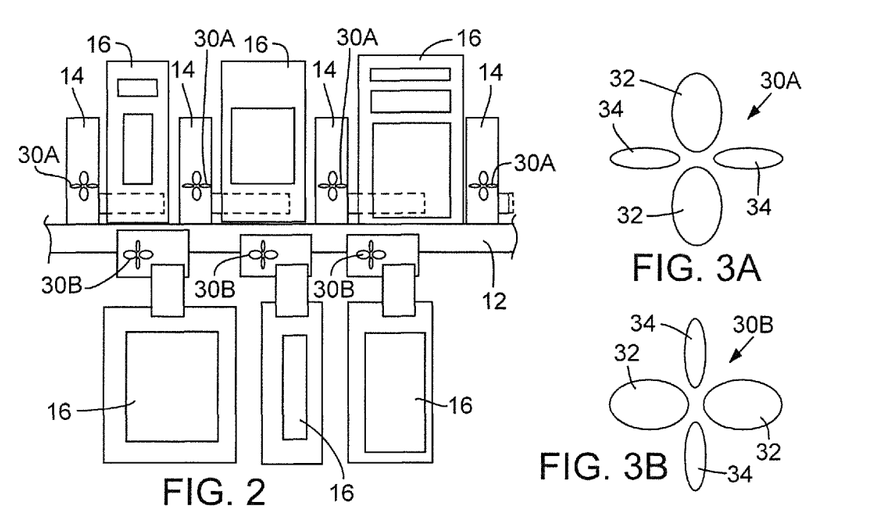
FIG. 2 is an enlarged view of a portion of FIG. 1B.
FIGS. 3A and 3B show exemplary location markers, with different rotational orientations.

FIG. 1A shows an exemplary embodiment of a vending machine 10 that can automatically determine locations and/or identities of products 16 inside the machine. The term "vending machine" is defined as any machine configured to vend or dispense (not necessarily at a cost) physical products, including automated retail kiosks. FIG. 1B shows the vending machine 10 with the front panel removed. The vending machine 10 can comprise an internal product support structure for supporting and displaying products. The support structure comprises an outer frame and one or more devices (such as shelves, hooks, etc.) coupled to the frame for supporting products within the vending machine. In a preferred embodiment, the product support structure comprises one or more horizontally oriented shelves 12 and vertical dividers 14 coupled to the one or more shelves 12. Products 16 can be supported in various manners, such as resting on a shelf 12, hanging from a shelf or hook or clip, etc. As shown in FIG. 2, some products resting on the shelves 12 can be positioned between the dividers 14 and other products 16 can be suspended from the shelves 12. The shelves 12 can be adjustable vertically and the dividers 14 can be adjustable horizontally.

The products 16 can comprise a wide variety of products, including electronic devices, food products, beverages, books, other consumer products, etc. The cost of the products can vary greatly, from a few cents to several hundred dollars or more. For example, in some embodiments, high-end electronic products can be sold from the vending machine 10, such as phones, music players, cameras, computers, memory cards, video games, head phones, etc.

As shown in FIG. 1A, the vending machine 10 can comprise a user interface panel 18 for selecting and paying for desired products 16. The user interface 18 can comprise a display 20, a credit card reader 22, and/or other user interface devices. In one embodiment, a user can select a desired product by touching the display screen 20 and then can purchase the desired product by swiping a credit card through credit card reader 22. Upon selection and payment, the desired product can be retrieved using an automated, movable carriage 40 and can be dispensed through an opening 24.

As shown in FIG. 2, location markers 30 can be located on front facing surfaces of the dividers 14, the shelves 12, and/or on hanging features coupled between the shelves and hanging products. The location markers 30 can comprise predetermined patterns, or "mouse points", such as the patterns shown in FIGS. 3A and 3B, or any other recognizable pattern. The location markers 30 can be used to indicate the horizontal and/or vertical positions of the shelves 12, dividers 14 and/or products 16 in the vending machine 10. The location markers can also be positioned at locations other than the front face. For example, optical light sources that used as location markers can be positioned to provide light adjacent to the dividers.

As shown in FIGS. 3A and 3B, the location markers 30 can comprise individual components 32, 34 and can have a rotational orientation. The exemplary location marker 30A comprises a pair of vertically oriented larger ovals 32 and a pair of horizontally oriented smaller ovals 32. The location marker 30A can thus have a first rotational orientation. The exemplary location marker 30B can be similar to the indicator 30A but rotated 90°, such that is has a second rotational orientation with the larger ovals 32 being horizontally oriented and the smaller ovals 34 being vertically oriented. The rotational orientation of a given location marker 30 can indicate the positioning of a product or products relative to the location marker. For example, the markers 30A can indicate a product is located horizontally adjacent to the marker, and the markers 30B can indicate a product is located vertically adjacent, e.g. below, the marker. Further, a pair of adjacent markers 30A with the same rotational orientation can indicate that a product is located between them, and the distance between the adjacent markers 30A can indicate a width of the product between them.

Location marker 30A and 30B are only examples, and the location marker 30 can comprise any other recognizable pattern, desirably with at least one plane of asymmetry such that different rotational orientations can be recognized. In other embodiments, a plurality of differently shaped location markers can be used to denote different meanings. It can be desirable that the markers 30 can be optically recognized from different viewpoint angles, not just from a straight-on viewpoint.

Figure 4:
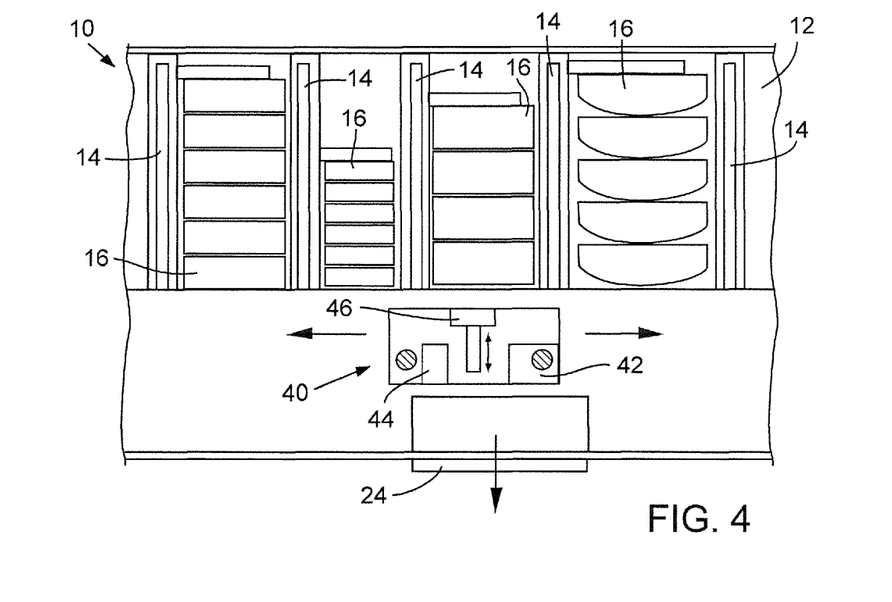
FIG. 4. is a top-down cross-sectional view of the vending machine showing an exemplary movable carriage in front of a shelf.

As shown in FIG. 4, the movable carriage 40 can comprise a movement mechanism 42, a product retrieval mechanism, or "grabber", 46, an optical sensor 44, and additional optional components. The movement mechanism 42 can comprise a motor or other known mechanism for moving the carriage 40. The carriage 40 can be moved horizontally and vertically (i.e., in the X and Y directions) across the front of the shelves 12 and the products 16 using the movement mechanism 42. The movement mechanism 42 can comprise a movement sensor 48 (see FIG. 5) that can determine the distance the carriage 40 moves in both the horizontal and vertical directions. The movement sensor 48 can comprise, for example, an optical sensor and/or optical encoder that counts the number of teeth, or etches, of a rotating gear that pass by it and uses the counted number of teeth to calculate a distance that the carriage has traveled. In some embodiments, the movement sensor can detect tiny fractions of a rotation of a gear, such as every $1/2048^{th}$ of a rotation. The position of the carriage can be determined based on the distance the carriage has traveled in the X and Y directions from a known starting point.

When the carriage 40 is positioned in front of a product 16, the grabber 46 can be used to remove the product from the shelf 12. In some embodiments, the grabber 46 can use suction to grab a product 16. In some embodiments, the grabber 46 can physically grip the product 16 or utilize other known means to remove the product from the shelf. The carriage 40 can then transport the product to opening 24 to dispense the product. Products 16 hanging below a shelf 12 can be coupled to the shelf in various manners, such as with a hook, a plastic block, or other hanging feature, that is attached to the shelf and attaches to the top of the hanging product. In such embodiments, location markers corresponding the hanging products can be located on the hanging features. In embodiments comprising such hanging features, the hanging features can be dropped to the bottom of the vending machine 10 and recycled after the product is detached from the hanging feature and dispensed.

The optical sensor 44 can comprise a camera or other device that can sense light, capture images, or otherwise optically detect a pattern such as the location markers 30. In one embodiment, the optical sensor 44 can comprise an eight-megapixel camera.

Figure 5:
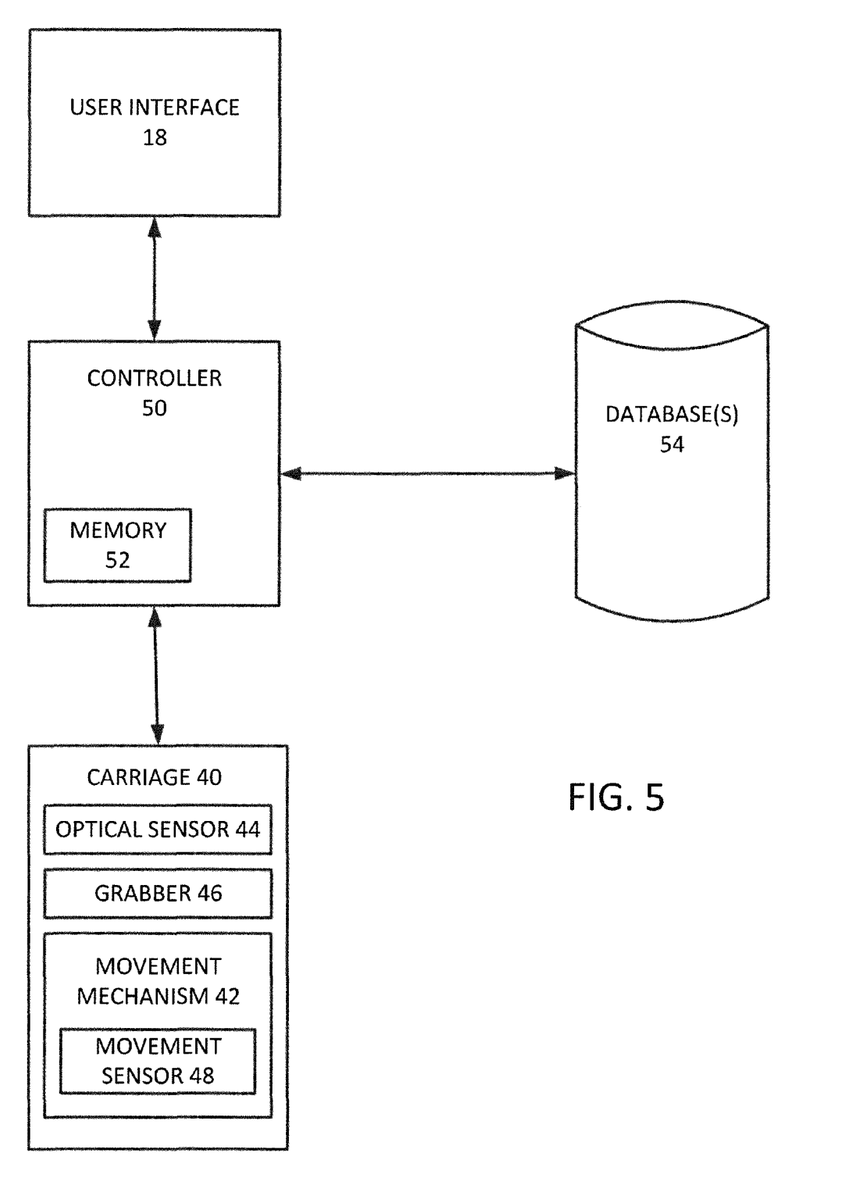
FIG. 5 is a schematic representation of a control system according to one exemplary embodiment.

The optical sensor 44 can be part of an optical recognition module that can optically recognize the location markers 30. The optical recognition module can further include a controller 50 (which can include memory 52) and/or a database 54, as shown in FIG. 5. The optical recognition module can convert an analog optical input into a digital signal for analysis.

Figure 6:
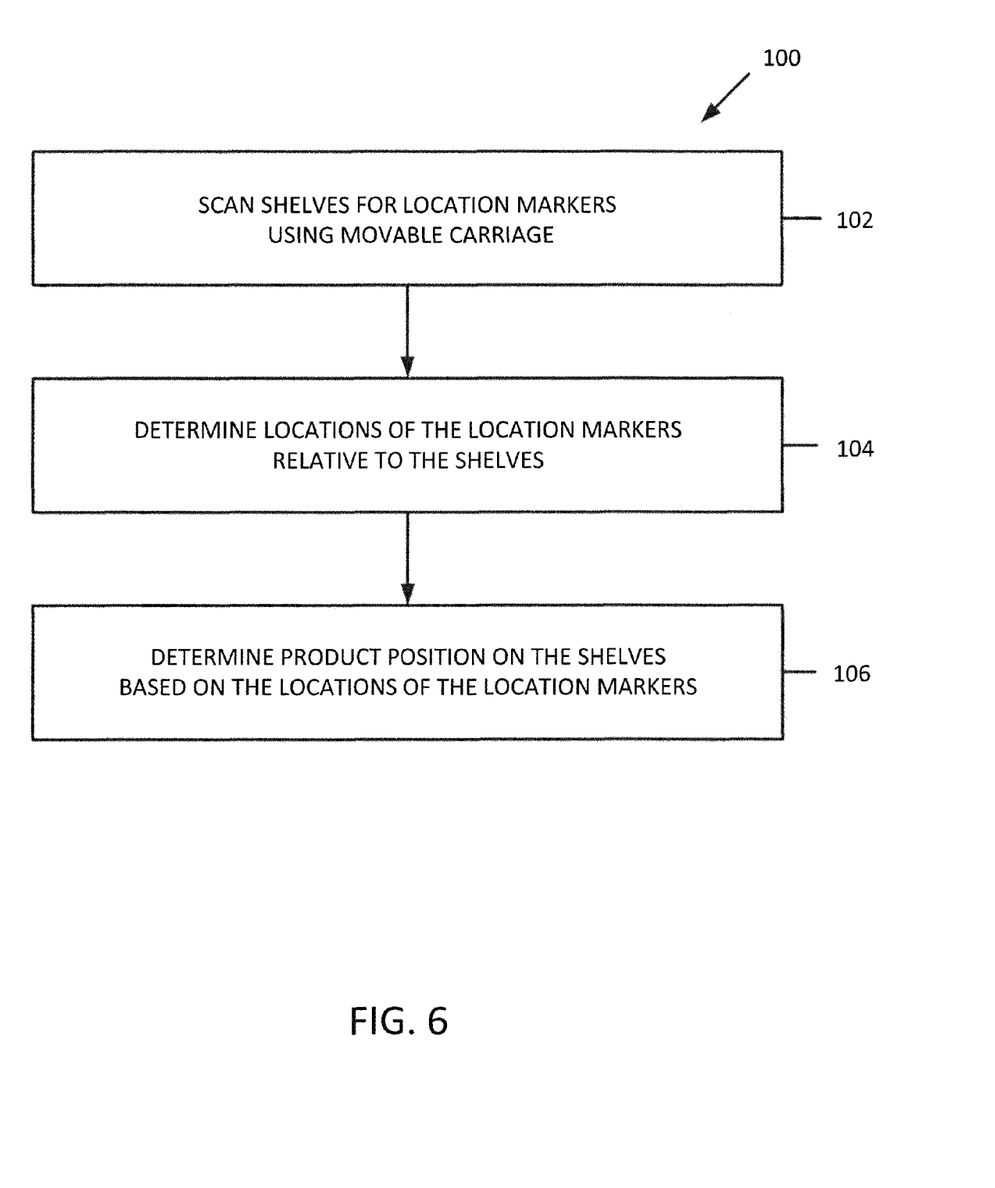
FIGS. 6-13 are flow charts illustrating exemplary methods disclosed herein.

FIG. 6 is a flowchart of an exemplary method 100 for determining the locations of products. At 102, the vending machine 10 can scan one or more shelves 12 for location markers 30 using the movable carriage 40, such as via the optical sensor 44. At 104, the locations of the location markers 30 can be determined relative to the shelves 12 and/or the dividers 14. The location of the location markers 30 can be determined based on the position of the carriage 40, as determined with the movement sensor 48. For example, in embodiments using an optical sensor, the optical sensor can capture several images of what is in front of it as the carriage 40 moves across the shelf 12. In these embodiments, the optical recognition module can then analyze those images and recognize the location markers 30. At 106, product positions on the shelves can be determined based on the location of the location markers 30.

Figure 7:
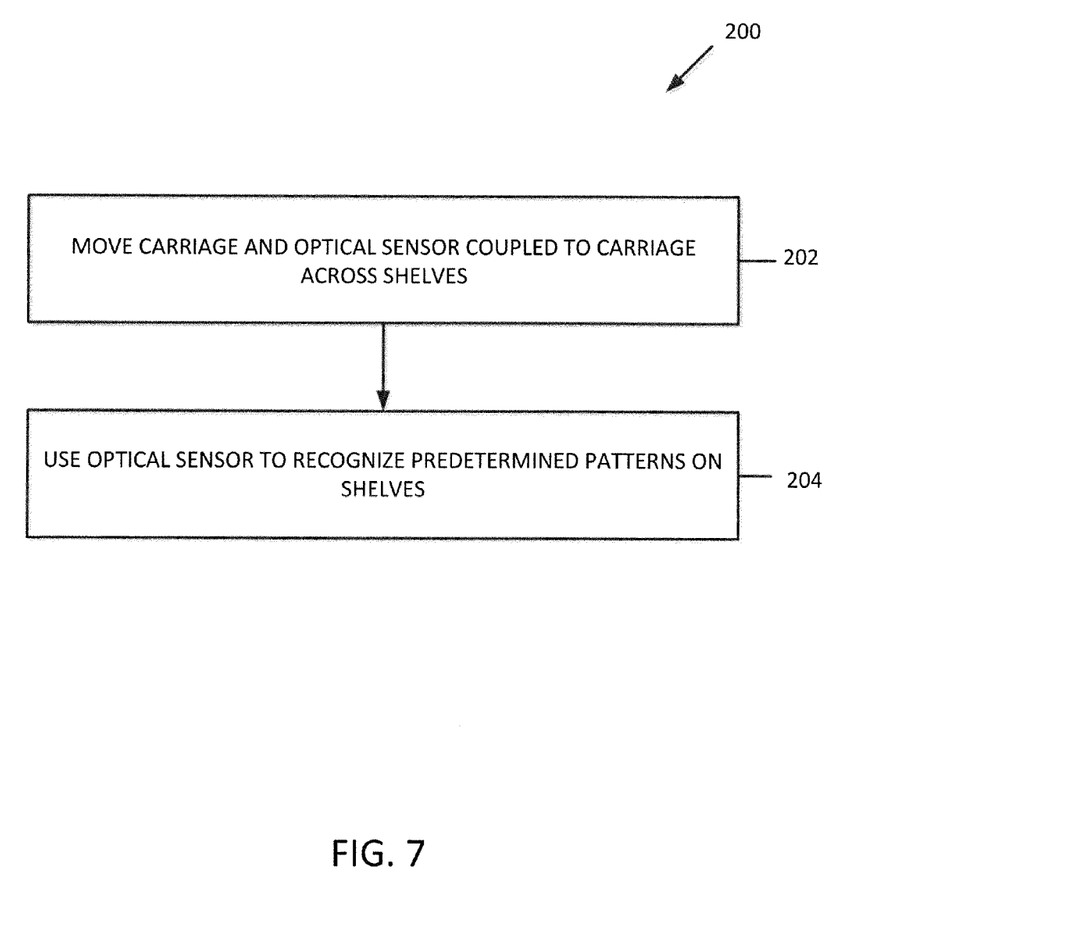

As shown in the flowchart 200 in FIG. 7, scanning of the shelves for location markers can comprise moving the carriage and an optical sensor coupled to the carriage across the shelves, at 202, and using the optical sensor to recognize predetermined patterns on the shelves, at 204.

As shown in FIG. 1A, the vending machine 10 can comprise several shelves 12, each with several dividers 14. A person can select a number of different products 16 to load in the vending machine 10 and can adjust the shelves 12 vertically and the dividers 14 horizontally to accommodate the different products 16. Once the products 16 are loaded in the vending machine 10, the vending machine can be turned on and the optical recognition module can be used to automatically optically scan the shelves and determine the vertical and horizontal positions of the location markers 30, such as relative to an origin location that is fixed relative to the frame of the vending machine 10. The carriage 40 can make a plurality of horizontal passes across the several shelves 12 to perform a full scan. For example, the carriage 40 can make one horizontal pass to scan the topmost shelf 12, then move down, then make another horizontal pass the scan the next shelf, and so on until all the shelves are scanned. Alternatively, the carriage 40 can utilize any other pattern of movement to scan the shelves.

The optical recognition module can further determine the location of the shelves 12 and dividers 14. In some embodiments, the optical recognition module can determine the vertical locations of the shelves from the positions of location markers 30B positioned on the shelves, and/or can determine the horizontal positions of the dividers 14 from the positions of the location markers 30A positioned on the dividers. In some embodiments, the optical recognition module can recognize the shapes (or other distinguishing characteristics) of the shelves and dividers and determine their positions directly. In such a case, the dividers and/or shelves themselves are the location markers. The determined positions of the shelves and dividers can also be stored in the database 54.

The locations of the products 16 can be determined based on the locations of the location markers 30 and/or the locations of the shelves 12 and dividers 14. For example, some products are positioned between two adjacent dividers 14 and resting on a shelf 12. Based on the vertical position of the shelf 12, the vertical boundaries of the product can be determined. The bottom of a product 16 can be assumed to be at the top surface of the shelf 12, and the top of the product can be calculated based on the height of the product itself. The left edge of the product can be determined based on the right edge of the divider 14 to the left of the product, and the right edge of the product can be determined based on the left edge of the divider to the left of the product. The horizontal midpoint of the product can be determined based a midpoint between the location markers 30A on either side of the product. This product location data can also be stored in the database 54.

Figure 8:
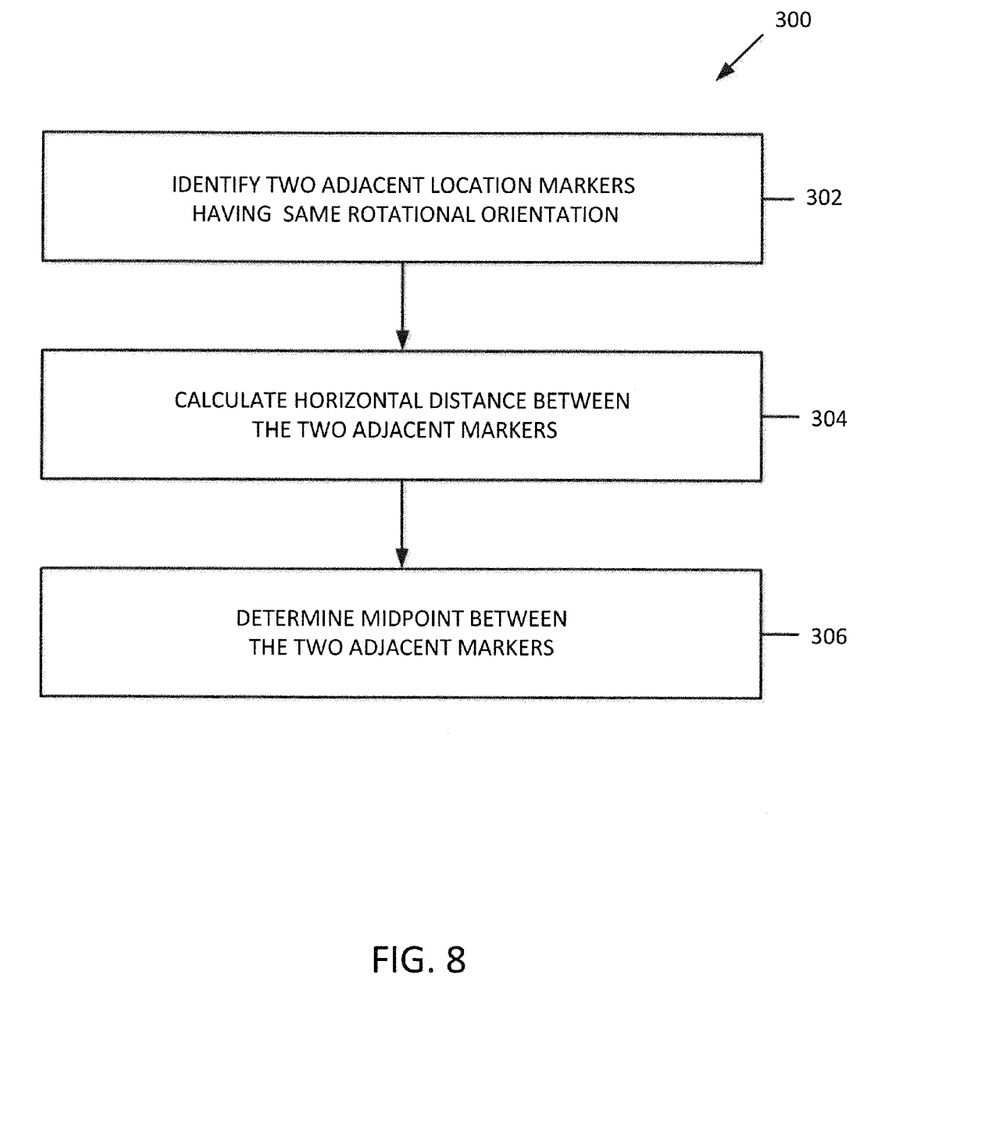

As shown in the flowchart 300 in FIG. 8, determining product position on the shelves based on the location of the location markers can comprise multiple steps. For example, at 302, two adjacent location markers can be identified having the same rotational orientation. At 304, a horizontal distance between the two adjacent markers can be calculated. At 306, a midpoint between the two adjacent markers can be determined.

The initial scanning to determine and store product locations and product identification information can be accomplished in a short time, such as under one minute, making the process much more efficient than manually entry.

In addition to product locations, identification information of the products 16 can also be stored in the database 54. The identification information of the products can comprise the product name, cost, size, UPC code, expiration date, technical specs, etc.

Once an initial scanning of the vending machine 10 is complete and the locations of the products 16, shelves 12, dividers 14 and/or location markers 30 are determined and stored, the vending machine can be ready to be used by purchasers. In response to a selection of a given product 16 by a purchaser, the vending machine 10 can look up the location of the given product in the database 54. Then carriage 40 can then automatically move in front of that location to retrieve the given product, and then dispense the given product through the opening 24.

Figure 9:
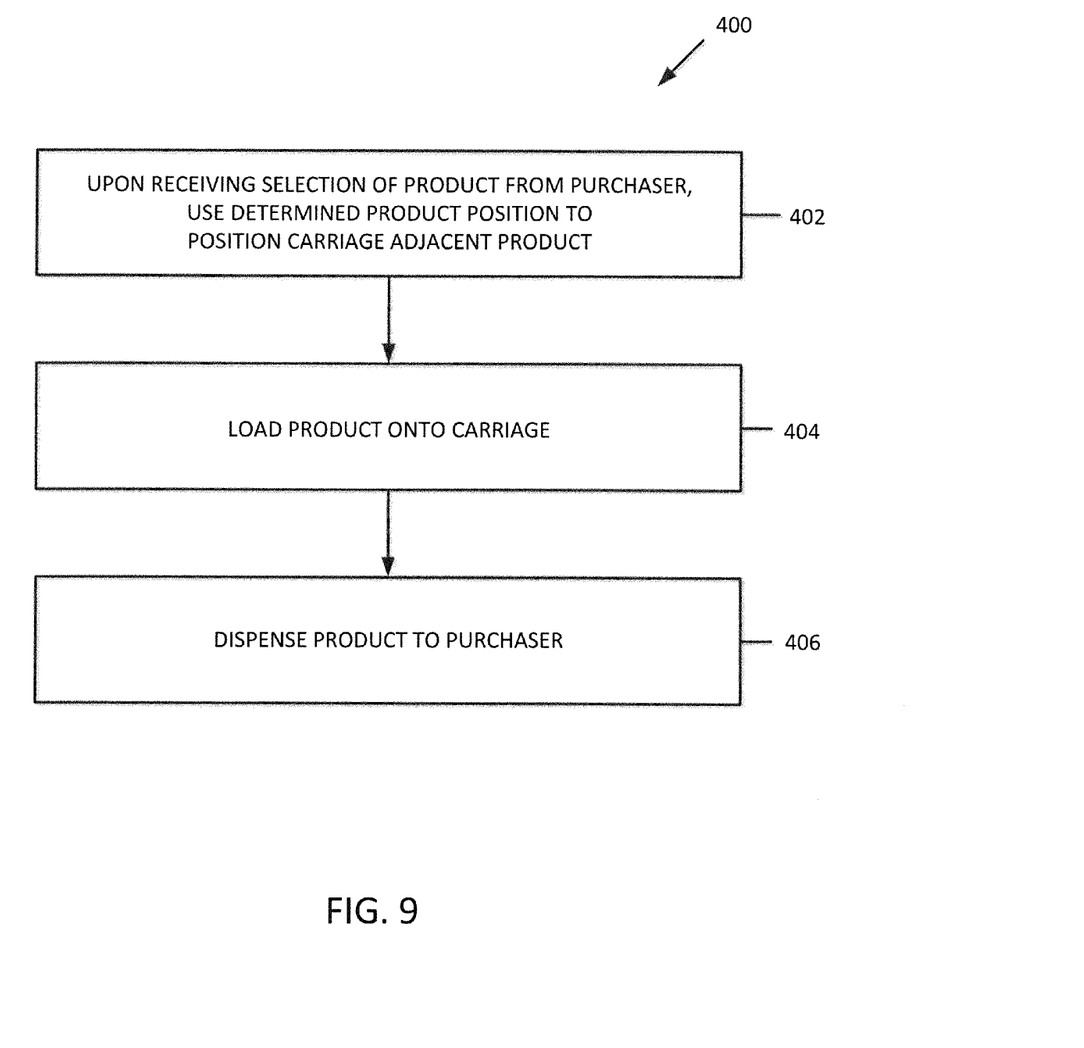

In the exemplary method 400 shown in FIG. 9, at 402, upon receiving a selection of a product from a purchaser, the determined product position can be used to position the carriage adjacent to the product. At 404, the product can be loaded onto the carriage. At 406, the product can be dispensed to the purchaser.

In some embodiments, the optical recognition module can be configured to optically determine identities of the products 16 using image recognition. As the carriage 40 moves across the products 16, the image recognition module can capture images, or continuous video, of the products using a camera attached to the carriage. The captured images can be of the forward facing aspects, or faces, of the products 16. The optical recognition module can then compare the captured images to a set of product images stored in a database to find a match. Each of the product images stored in the database can be correlated with a set of product identification information. This information can be preloaded into the database prior to the image recognition process. Comparing the captured images to the stored images can comprise regression analysis on subsections of the images, such as breaking the images down into subsections and comparing the corresponding pairs of subsections one at a time to look for matches. Other known image recognition techniques can also be used. Once a match is determined between a captured image and one of the stored product images, the product being analyzed can be identified and the corresponding product identification information can be stored in the database in correlation with the product location. Using this product image recognition method, the person loading products into the vending machine does not have to manually enter any information; the product identity and product location can be determined automatically during an initial optical scan by the optical recognition module.

The optical recognition module can also determine boundaries of a product in the X-Y plane, or a silhouette profile of the product, from the captured image. For example, this silhouette profile can be determined from the contrast between the brightness of the product face compared to a dark background in the vending machine. Product identification can be determined by comparing the silhouette profile to stored profiles of product images stored in a database.

Figure 10:
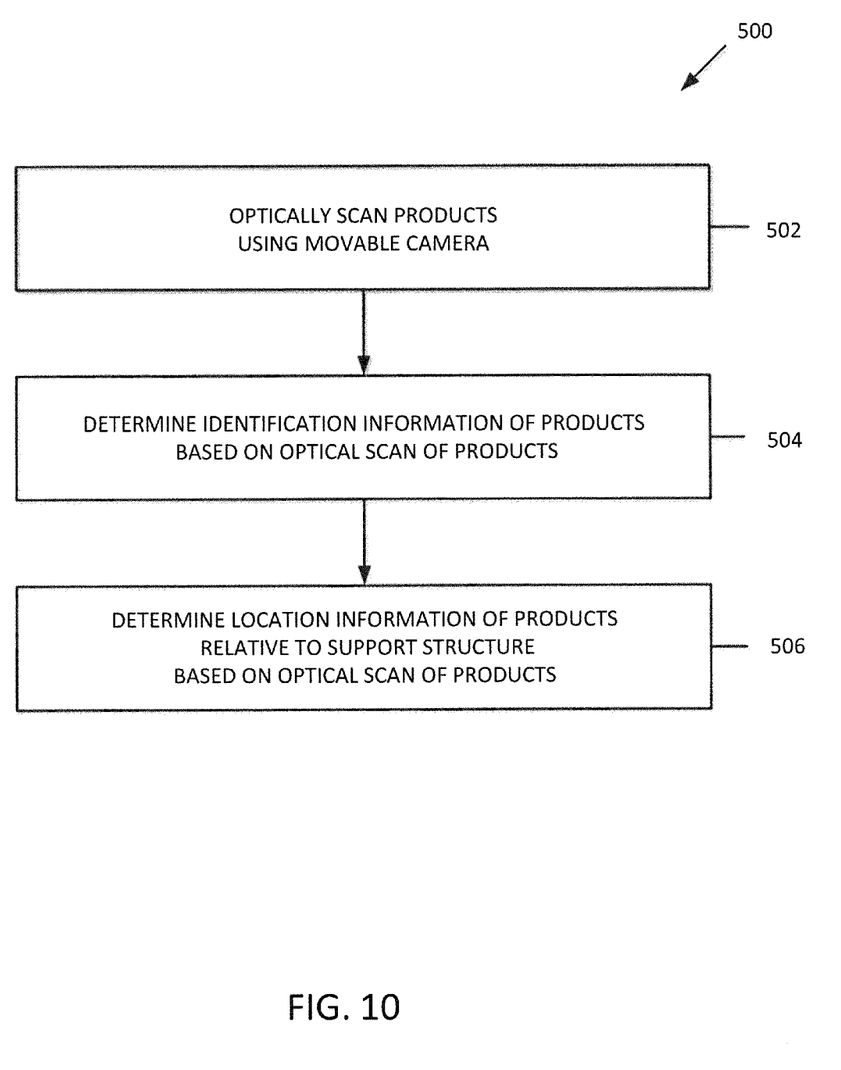
Figure 11:
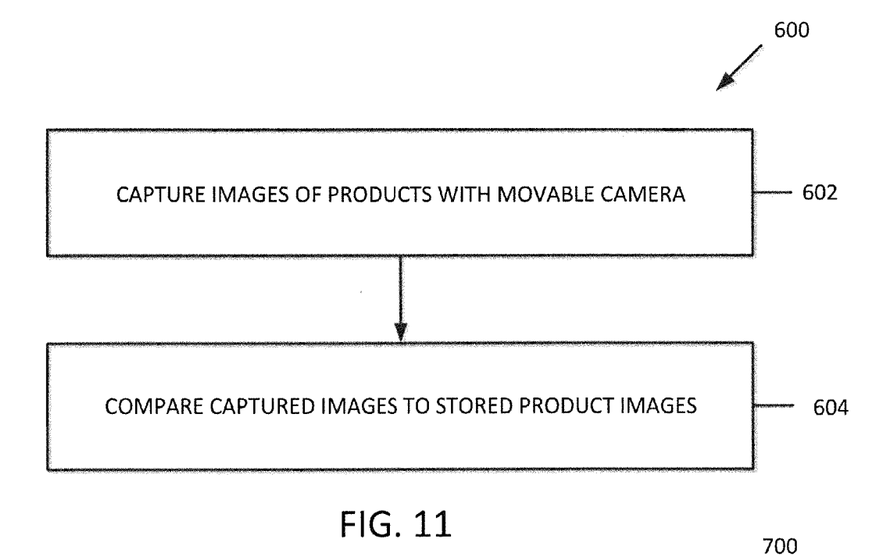

FIG. 10 is a flowchart of an exemplary method 500 for utilizing optical product recognition. At 502, a movable camera can be used to optically scan the products on the shelves. At 504, identification information of the products can be determined based on the optical scan of the products. At 506, location information of the products relative to the support structure of the vending machine 10 can be determined based on the optical scan of the products. The flow chart 600 of FIG. 11 illustrates that determining identification information of the products at process block 504 can comprise capturing images of products with the movable camera at 602, and comparing the captured images to stored product images at 604. The flow chart 700 in FIG. 12 illustrates that comparing the captured and stored images in process block 604 can comprise dividing the captured images and the stored images into subsections at 702, and comparing corresponding subsections of the captured and stored images at 704.

In response to a selection of a desired product by a purchaser, the desired product can be retrieved using the carriage based on the stored correlation between the product identity and the product location. Furthermore, during or after retrieval of the a product based on the stored information, the identity of the retrieved product can be verified by capturing an image of the retrieved product and comparing the captured image to the stored image of the desired product. If the captured image of the retrieved product matches the stored image of the desired product, the retrieved product can be verified and vended. If the captured image does not match the stored image of the desired product, an error can be determined. The vending machine can then try again to retrieve the desired product and/or the transaction can be canceled. This can prevent the vending of the wrong product, such as the vending of a very expensive product at the cost of a cheap product.

Figure 12:
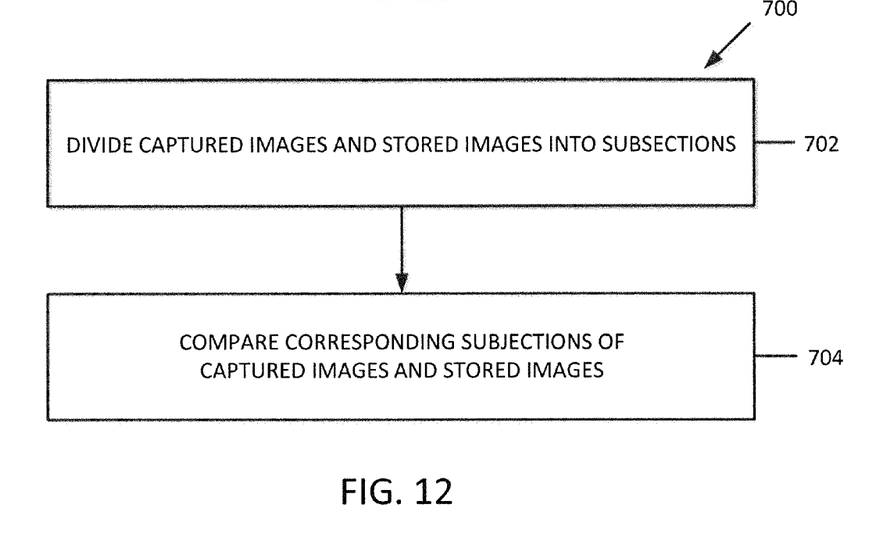
Figure 13:
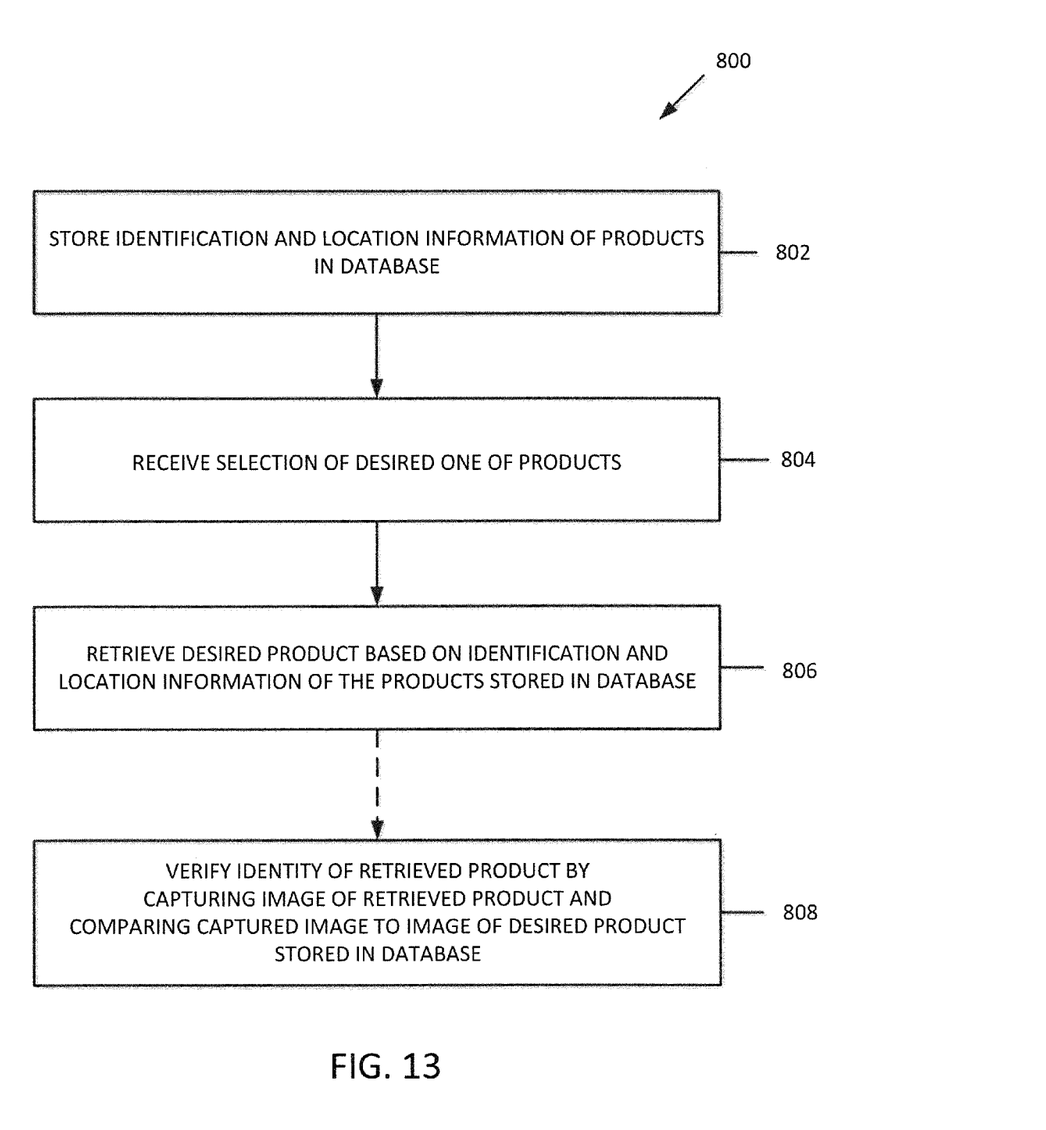

FIG. 13 is a flow chart of an exemplary method 800 that can be performed in addition to the methods shown in FIGS. 10-12. At 802, identification and location information of the products can be stored in a database. At 804, a selection of a desired one of the products can be received. At 806, the desired product can be retrieved based on the identification and location information of the products that is stored in the database. At 808, the identity of the retrieved products can be verified by capturing an image of the retrieved product and comparing the captured image to a stored image of the desired product. Process blocks 802, 804 and 806 can be performed with or without process block 808.

The product recognition methods disclosed herein can be used in conjunction with the location marker recognition methods disclosed herein, or they can be used independently.

In alternative embodiments, location markers 30 can be recognized other than optically or by alternative optical means. In some embodiments, a sensor other than an optical sensor can be used in place of the optical sensor 44, such as a physical sensor, audio sensor, etc., in conjunction with corresponding location markers. For example, the location markers 30 can comprise physical protrusions, such as bumps or flags, that can be recognized by a pressure sensitive sensor attached to the carriage as the sensor moves past the protrusions (like moving a finger over brail). In another example, the location markers 30 can comprise RF emitters and an RF sensor can be attached to the carriage to detect the locations of the emitters. In similar embodiments, more than one RF sensor can be used to triangulate the locations of the RF emitters, optionally with the RF sensor being stationary rather than being coupled to the carriage. In another example, the location markers can comprise LEDs and an optical sensor can detect the location of the LEDs. In another example, the location markers can be audio emitters that can be sensed by audio sensors to determine their positions. Thus, a variety of different types of location markers and sensors can be used to determine the locations of the location markers.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

I claim:

1. A vending machine, comprising:
   at least one horizontally oriented shelf for supporting products to be vended;
   a plurality of vertically oriented dividers coupled to the shelf, the dividers being individually adjustable side-to-side of the shelf for accommodating different sized products between the dividers;
   a plurality of location markers located on the dividers, on the shelf, or on both the dividers and the shelf; and
   an optical recognition module configured to optically recognize the location markers and to determine horizontal positions of the location markers relative to the shelf.

2. The vending machine of claim 1, wherein the location markers comprise predetermined patterns, and wherein rotational orientation of the patterns indicates positioning of corresponding products relative to the location markers.

3. The vending machine of claim 1, wherein the optical recognition module comprises an optical sensor coupled to a carriage, the carriage being movable horizontally and vertically relative to the shelf.

4. The vending machine of claim 3, wherein the optical recognition module is configured to optically scan the at least one shelf, determine the locations of the location markers, and store the locations of the location markers in a database.

5. The vending machine of claim 4, wherein the vending machine comprises a plurality of horizontally oriented shelves, and wherein the optical sensor is configured to make multiple horizontal scans across the shelves, each horizontal scan being at a different vertical position, to determine vertical and horizontal positions of the location markers.

6. The vending machine of claim 4, wherein, in response to a selection of a given product, the vending machine is configured to determine the location of the given product relative to the shelf based on the locations of the location markers stored in the database.

7. The vending machine of claim 1, wherein the optical recognition module is configured to optically determine identities of products supported by the shelf.

8. The vending machine of claim 7, wherein, in response to a selection of a desired product, the vending machine is configured to retrieve the desired product based on the determined positions of the location markers, and the optical recognition module is configured to verify the identity of the retrieved product by taking an image of the retrieved product and comparing it to an image of the desired product that is stored in a database.

9. The vending machine of claim 1, wherein the shelf is configured to support at least one product resting on an upper surface of the shelf between two of the vertical dividers positioned on opposing sides of the product, and a location marker is positioned on each of the two vertical dividers.

10. The vending machine of claim 1, wherein the shelf comprises hanging features for hanging products from the shelf, and corresponding location markers are positioned on the hanging features.

11. A method comprising:
    in a vending machine having multiple shelves and a movable carriage, scanning the shelves for location markers using the movable carriage, the location markers being horizontally adjustable side-to-side of the shelves;
    determining horizontal locations of the location markers relative to the shelves; and
    determining product position on the shelves of the vending machine based at least in part on the horizontal locations of the location markers.

12. The method of claim 11, wherein scanning the shelves for location markers comprises:
    moving the carriage and an optical sensor coupled to the carriage across the shelves; and
    using the optical sensor to recognize predetermined patterns on the shelves.

13. The method of claim 11, wherein determining locations of the location markers comprises:
    determining horizontal and vertical positions of the location markers relative to a fixed origin.

14. The method of claim 11, wherein determining product position on the shelves based on the locations of the location markers comprises:
    identifying two adjacent location markers having a same rotational orientation;
    calculating a horizontal distance between the two adjacent location markers; and
    determining a midpoint between the two adjacent location markers.

15. The method of claim 11, further comprising:
    capturing images of products supported by the shelves; and
    comparing the captured images to product images stored in a database to determine identification information for the products supported by the shelves.

16. The method of claim 11, further comprising:
    upon receiving a selection of a product from a purchaser, using the determined product position to position the carriage adjacent the product;
    loading the product onto the carriage; and
    dispensing the product to the purchaser.

17. The method of claim 11, further comprising:
    optically scanning products supported by the shelves using a movable camera on the movable carriage;
    determining identification information of the products based on the optical scanning of the products; and
    determining location information of the products relative to the shelves based on the optical scanning of the products.

18. The method of claim 17, wherein determining identification information of the products comprises:
    capturing images of the products with the movable camera; and
    comparing the captured images to stored product images.

19. The method of claim 18, wherein comparing comprises:
    dividing the captured images and the stored images into subsections; and
    comparing corresponding subsections of the captured and stored images.

20. The method of claim 17, wherein determining location information of the products comprises determining horizontal and vertical boundaries of the products.

21. The method of claim 17, further comprising:
    storing the identification and location information of the products in a database;
    receiving a selection of a desired one of the products; and
    retrieving the desired product based on the identification and location information of the products stored in the database.

22. The method of claim 21, further comprising verifying the identity of a retrieved product by capturing an image of the retrieved product and comparing the captured image to an image of the desired product that is stored in a database.

* * * * *